US012631581B2

(12) United States Patent
Koshiya et al.

(10) Patent No.: US 12,631,581 B2
(45) Date of Patent: May 19, 2026

(54) SPECTRUM ANALYSIS APPARATUS AND DATABASE CREATION METHOD

(71) Applicant: JEOL Ltd., Tokyo (JP)

(72) Inventors: Shogo Koshiya, Tokyo (JP); Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 1099 days.

(21) Appl. No.: 17/697,236

(22) Filed: Mar. 17, 2022

(65) Prior Publication Data

US 2022/0307996 A1 Sep. 29, 2022

(30) Foreign Application Priority Data

Mar. 23, 2021 (JP) .................................. 2021-048914

(51) Int. Cl.
G01N 23/2252 (2018.01)

(52) U.S. Cl.
CPC ... G01N 23/2252 (2013.01); *G01N 2223/079* (2013.01)

(58) Field of Classification Search
None
See application file for complete search history.

(56) References Cited

U.S. PATENT DOCUMENTS 6,385,281 B1 5/2002 Ozawa et al.
7,411,188 B2 * 8/2008 deCecco ................. H01J 37/26
250/306

2002/0158200 A1 10/2002 Terauchi
2015/0276952 A1 10/2015 Morita
2017/0067837 A1 3/2017 Shima
2017/0167991 A1 * 6/2017 Schwager .......... G01N 23/2206
2019/0049396 A1 * 2/2019 Murano ............. G01N 23/2252
2021/0372953 A1 * 12/2021 Sato ...................... G01N 23/22
2022/0050068 A1 2/2022 Tanaka

FOREIGN PATENT DOCUMENTS

JP 1141345 A 6/1989
JP H10197457 A 7/1998
JP 2001083109 A 3/2001
JP 2002329473 A 11/2002
JP 201441065 A 3/2014
JP 2014173864 A 9/2014
JP 201753639 A 3/2017
JP 202147154 A 3/2021
WO 2020121918 A1 6/2020

OTHER PUBLICATIONS

ThermoFisher article, "What is XRF (X-ray Fluorescence) and How Does it Work?", Jan. 2020 (Year: 2020).*

(Continued)

*Primary Examiner* — Lina Cordero
(74) *Attorney, Agent, or Firm* — The Webb Law Firm

(57) ABSTRACT

A plurality of records are registered in a database. Each record includes emission information and a peak energy sequence. A fitting unit fits, for each peak energy sequence, a calculated spectrum which is based on the peak energy sequence with respect to an actual spectrum which is acquired from a sample. An analyzer analyzes the sample based on the emission information correlated to the calculated spectrum satisfying a fitting condition.

9 Claims, 12 Drawing Sheets

(56) References Cited

OTHER PUBLICATIONS

Office Action issued in JP2021-048914 on Mar. 14, 2023.
Office action issued in EP22162214.5 on Apr. 3, 2024.
Extended European Search Report issued in EP22162214.5 on Aug. 9, 2022.
Nilsson et al., An ultrathin buried Si layer in GaAs studies by soft X-ray emission spectroscopy and surface X-ray diffraction: theory and experiment, Journal of Alloys and Compounds, vol. 286, 1999, pp. 31-36.
Yokoyama et al., Experimental Study of SXES: Determination of Iron Oxidation State in Silicate Minerals, Microscopy and Micro-analysis, vol. 26, No. S2, 2020, pp. 1018-1021.
Guo et al., In situ and ex situ characterization of thin films by soft X-ray emission spectroscopy, Journal of Electron Spectroscopy and Related Phenomena, vol. 110, 2000, pp. 41-67.
Mcalister et al., Soft x-ray emission spectra of metallic solids: critical review of selected systems and annotated spectral index, National Institute of Standards and Technology, Jan. 1, 1974, pp. 1-186.

* cited by examiner

| COM-POUND | STRUC-TURE | EMISSION ELEMENT | EMISSION X-RAY | PEAK ENERGY SEQUENCE | ⋮ |
|---|---|---|---|---|---|
| ***** | ** | A | a1,a2 | E1,E2,E3,E4 | ⋮ |
| | | B | b1 | E5,E6 | ⋮ |
| | | ⋮ | ⋮ | ⋮ | ⋮ |
| | ** | A | a1,a2, | E7,E8,E9 | ⋮ |
| | | B | b1 | E10,E11 | ⋮ |
| | | ⋮ | ⋮ | ⋮ | ⋮ |
| ⋮ | ⋮ | ⋮ | ⋮ | ⋮ | ⋮ |

86 — COMPOUND
88 — STRUCTURE
90 — EMISSION ELEMENT
92 — EMISSION X-RAY
84 — PEAK ENERGY SEQUENCE
82
34

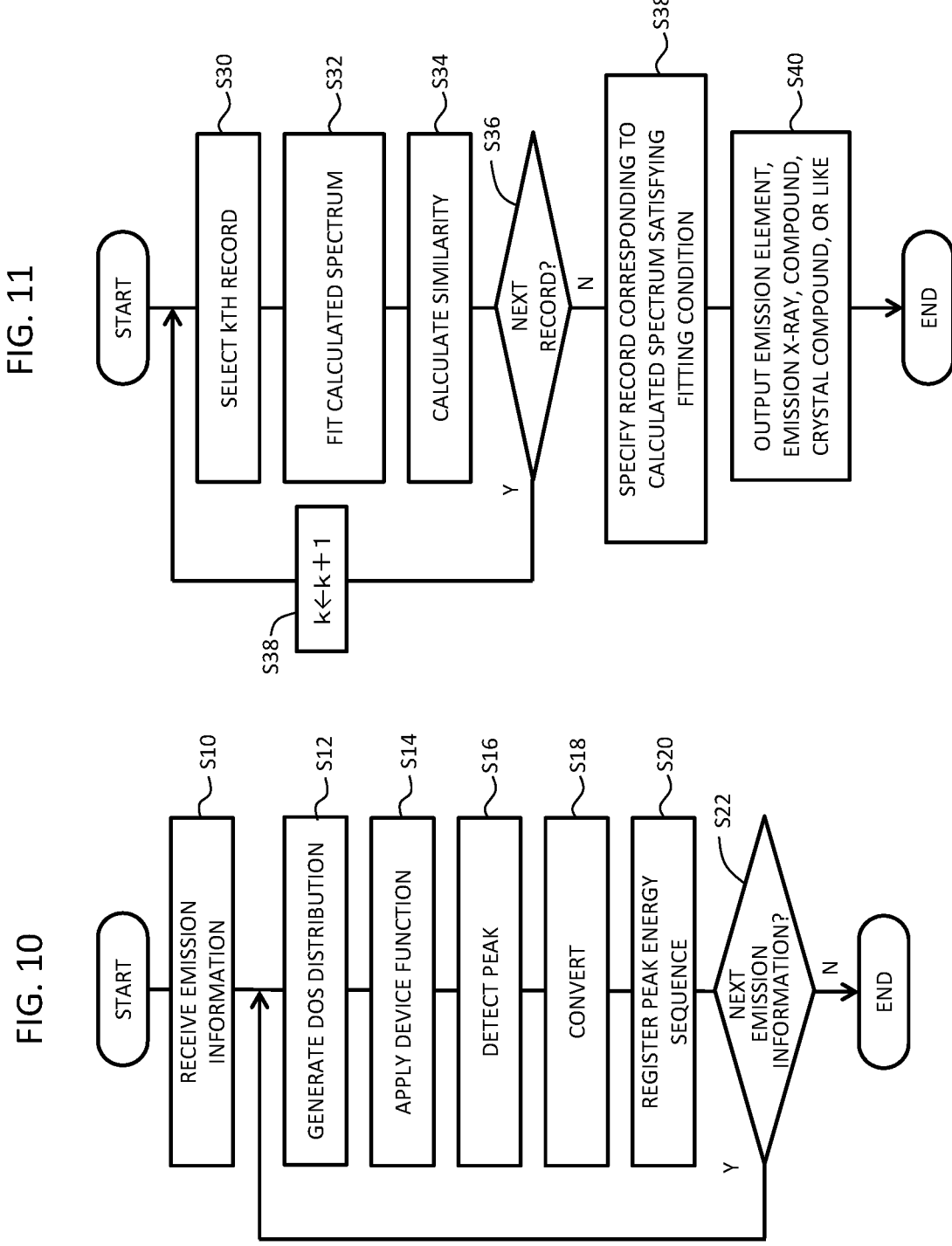

FIG. 11

START

SELECT kTH RECORD — S30

FIT CALCULATED SPECTRUM — S32

CALCULATE SIMILARITY — S34

NEXT RECORD? — S36 k ← k + 1 — S38

Y

N

SPECIFY RECORD CORRESPONDING TO CALCULATED SPECTRUM SATISFYING FITTING CONDITION — S38

OUTPUT EMISSION ELEMENT, EMISSION X-RAY, COMPOUND, CRYSTAL COMPOUND, OR LIKE — S40

END

FIG. 10

START

RECEIVE EMISSION INFORMATION — S10

GENERATE DOS DISTRIBUTION — S12

APPLY DEVICE FUNCTION — S14

DETECT PEAK — S16

CONVERT — S18

REGISTER PEAK ENERGY SEQUENCE — S20

NEXT EMISSION INFORMATION? — S22

Y

N

END

| COM-POUND | CRYSTAL STRUCTURE | EMISSION ELEMENT | EMISSION X-RAY | PEAK ENERGY SEQUENCE | ... | ACTUAL SPECTRUM | FUNCTION SET |
|---|---|---|---|---|---|---|---|
| ***  |   | A | a1,a2 | E1,E2,E3,E4 | ... | *** | ,,*, ,** |
|  |  | B | b1 | E5,E6 | ... | *** | *,***, |
|  |  | ... | ... | ... | ... | ... | ... |
|  |   | A | a1,a2, | E7,E8,E9 | ... | * | ,*,*, ,*** |
|  |  | B | b1 | E10,E11 | ... | *** | *,***, |
|  |  | ... | ... | ... | ... | ... | ... |
| ... | ... | ... | ... | ... | ... | ... | ... |

86  88  90  92  84  120  122  82

34A

SPECTRUM ANALYSIS APPARATUS AND DATABASE CREATION METHOD

CROSS REFERENCE TO RELATED APPLICATION

This application claims priority to Japanese Patent Application No. 2021-048914 filed Mar. 23, 2021, the disclosure of which is hereby incorporated by reference in its entirety.

BACKGROUND OF THE INVENTION

Field of the Invention

The present disclosure relates to a spectrum analysis apparatus and a method of creating a database, and in particular to a technique for analyzing a sample by fitting a calculated spectrum with respect to an actual spectrum which is acquired from the sample.

Description of Related Art

A spectrum can be generated by spectrally dispersing a signal emitted from a sample (such as X-rays, photoelectrons, ultraviolet rays, or the like). The sample is analyzed through analysis of the spectrum. An example of the spectrum includes a characteristic X-ray spectrum. In recent years, spectrometers are put to practical use that can measure a spectrum of a characteristic X-ray belonging to a soft X-ray region. The soft X-ray region is, for example, an energy band having an energy lower than a few hundreds of eV's or lower than 100 eV. The spectrum in this energy band includes a peak showing a characteristic X-ray generated due to electron transition from a valence band (outer shell electron orbit) to an inner shell electron orbit. A chemical bonding state in the sample (such as a molecular structure, a crystal structure, or the like) in the sample can be clarified through analysis of the peak. A method of measuring and analyzing the soft X-ray spectrum is also called Soft X-ray Emission Spectroscopy.

When various spectra acquired from various compounds are registered in a database as reference spectra, the sample can be identified by fitting the group of spectra (group of reference spectra) registered in the database and the spectrum acquired from the sample (measured spectrum) (fingerprint method). However, when it is difficult to acquire a large number of reference spectra or when a large number of reference spectra are not yet registered in the database, use of the above-described method is not possible. For example, in regard to the characteristic X-ray belonging to the soft X-ray region, currently, a sufficient number of reference spectra are not yet acquired. Even when a large number of reference spectra are already accumulated, realizing a novel technique for analyzing the spectrum is meaningful for the progress of scientific technologies.

JP 2017-53639 A (Document 1) and JP H1-141345 A (Document 2) disclose methods of analyzing a spectrum, but these documents are silent in regard to a spectrum analyzing technique which uses peak information which is calculated based on theory.

An advantage of the present disclosure lies in realization of a novel spectrum analysis technique. Alternatively, an advantage of the present disclosure lies in enabling analysis of a spectrum acquired from a sample even in a situation in which a large number of reference spectra are not yet acquired.

SUMMARY OF THE INVENTION

According to one aspect of the present disclosure, there is provided a spectrum analysis apparatus comprising: a database in which a peak energy sequence correlated to emission information is registered; a fitting unit that fits a calculated spectrum which is based on the peak energy sequence with respect to an actual spectrum which is acquired from a sample; and an analyzer that analyzes the sample based on the emission information correlated to the calculated spectrum when the calculated spectrum satisfies a fitting condition.

According to another aspect of the present disclosure, there is provided a method of creating a database, the method comprising: calculating a distribution of a density of states of electrons based on emission information; detecting one or a plurality of peaks included in the distribution of the density of states of the electrons or in a waveform generated from the distribution of the density of states of the electrons; specifying a peak energy sequence based on the one or the plurality of peaks that are detected; and registering the peak energy sequence in a database for generating a calculated spectrum to be compared to an actual spectrum which is acquired from a sample, wherein the peak energy sequence determines an energy position of one or a plurality of functions of the calculated spectrum.

According to another aspect of the present disclosure, there is provided a program which is executed by an information processing device, the program comprising the functions of: acquiring a peak energy sequence correlated to emission information; fitting a calculated spectrum which is based on the peak energy sequence with respect to an actual spectrum which is acquired from a sample; and analyzing the sample based on the emission information correlated to the calculated spectrum when the calculated spectrum satisfies a fitting condition.

BRIEF DESCRIPTION OF DRAWINGS

Embodiment(s) of the present disclosure will be described based on the following figures, wherein:

FIG. 1 is a block diagram showing a spectrum measurement system according to an embodiment of the present disclosure;

FIG. 3 is a block diagram showing an example structure of a calculation control unit;

FIG. 4 is a diagram showing an example of a database;

FIG. 10 is a flowchart showing a method of creating a database;

FIG. 11 is a flowchart showing a method of analyzing a spectrum;

FIG. 12 is a block diagram showing a calculation control unit according to an alternative configuration; and FIG. 13 is a diagram showing a database according to an alternative configuration.

DESCRIPTION OF THE INVENTION

Figure 2:
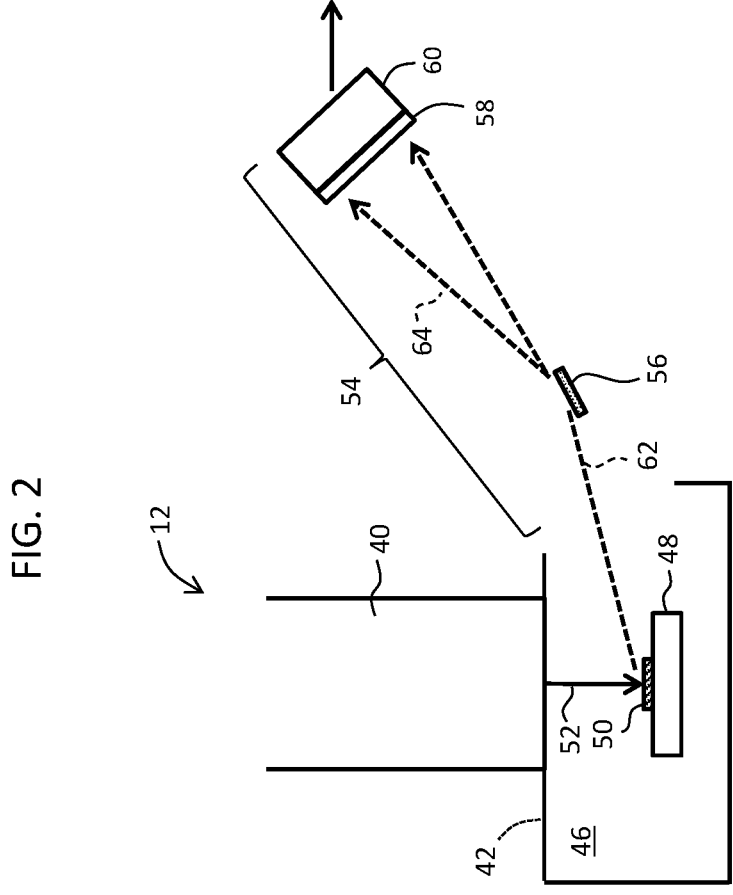
FIG. 2 is a schematic diagram showing a measurement apparatus.

An embodiment of the present disclosure will now be described with reference to the drawings.

(1) Overview of Embodiment

A spectrum analysis apparatus according to an embodiment of the present disclosure comprises a database, a fitting unit, and an analyzer. In the database, a peak energy sequence correlated to emission information is registered. The fitting unit fits a calculated spectrum which is based on the peak energy sequence with respect to an actual spectrum which is acquired from a sample. The analyzer analyzes the sample based on the emission information correlated to the calculated spectrum when the calculated spectrum satisfies a fitting condition. In an embodiment of the present disclosure, a processor functions as the fitting unit and the analyzer.

According to the configuration described above, a calculated spectrum for the fitting process can be generated based on the peak energy sequence registered in the database. Even in a situation where the spectrum for the fitting process is not yet acquired, the spectrum fitting may be executed. The emission information is correlated to the peak energy sequence, and the sample can be analyzed based on the emission information.

The peak energy sequence may be specified from the actual spectrum, but in an embodiment of the present disclosure, the peak energy sequence is calculated based on theory and from the emission information. According to this method, various peak energy sequences corresponding to various emissions can be easily generated.

In an embodiment of the present disclosure, a plurality of peak energy sequences correlated to a plurality of sets of emission information are registered in the database. A plurality of calculated spectra are generated based on the plurality of peak energy sequences. In the spectrum analysis, each individual calculated spectrum is fitted with respect to the actual spectrum which is acquired from the sample. In this process, for example, similarity is calculated between the actual spectrum and each calculated spectrum. In this case, a calculated spectrum which satisfies the fitting condition is, for example, a calculated spectrum having the highest similarity, or a calculated spectrum having similarity of a predetermined value or greater. The sample is analyzed based on the emission information specified from the calculated spectrum which satisfies the fitting condition. For example, an element, an emission type, a compound, a crystal structure, or the like may be analyzed. The concept of the actual spectrum which is acquired from the sample includes a characteristic X-ray spectrum, a fluorescence X-ray spectrum, a photoelectron spectrum, an ultraviolet ray spectrum, or the like.

In an embodiment of the present disclosure, the emission information is formed from a plurality of information items. The plurality of information items include information for specifying an element which caused the emission, and information for specifying a type of emission. The type of emission is, for example, a type of the characteristic X-ray. The plurality of information items further include information for specifying a compound containing the element which caused the emission, and information for specifying a crystal structure of the compound.

In an embodiment of the present disclosure, the fitting unit determines one or a plurality of energy positions of one or a plurality of functions forming the calculated spectrum based on one or a plurality of peak energies forming the peak energy sequence. The fitting unit adjusts one or a plurality of forms of the one or the plurality of functions forming the calculated spectrum such that the calculated spectrum becomes closer to the actual spectrum. The peak energy is a position, that is, an energy, of a point representing the peak (such as an apex, a center-of-gravity point, a center point, or the like).

In an embodiment of the present disclosure, each of the functions has a mountain-like form. The fitting unit causes an energy position of an apex of each of the functions forming the calculated spectrum to correspond to one of the peak energies of the peak energy sequence. For example, the energy positions of the apexes of the functions are made to coincide with the peak energies. The calculated spectrum is fitted with respect to the actual spectrum by adjusting a group of parameters of each individual function such as intensity and half width. The energy position is a position on an energy axis.

A spectrum analysis apparatus according to an embodiment of the present disclosure further comprises a database creator. The database creator generates the peak energy sequence based on the emission information, and registers the emission information and the peak energy sequence in the database. In an embodiment of the present disclosure, the processor functions as the database creator.

In an embodiment of the present disclosure, the database creator generates a distribution of a density of states of electrons based on the emission information. The database creator generates the peak energy sequence from the distribution of the density of states of the electrons.

In an embodiment of the present disclosure, the database creator generates a spread waveform by applying a spread function with respect to the distribution of the density of states of the electrons. The database creator detects one or a plurality of peaks included in the spread waveform. The database creator specifies the peak energy sequence based on the one or the plurality of peaks.

The spread function may be determined through experiments. Alternatively, the spread function may be corrected based on a track record of the spectrum fitting. Alternatively, the actual spectrum which is the analysis target or a function parameter set used in the analysis may be registered in the database.

In an embodiment of the present disclosure, the distribution of the density of states of the electrons includes a distribution of a density of states of electrons in an outer shell electron orbit in a valence band. The outer shell electron orbit is a transition-origin orbit in electron transition which causes a characteristic X-ray. In an embodiment of the present disclosure, the distribution of the density of states of the electrons further includes a distribution of a density of states of electrons in an inner shell electron orbit. The inner shell electron orbit is a transition-destination orbit in the electron transition.

The soft X-ray is caused by the electron transition from the outer shell electron orbit to the inner shell electron orbit. The spectrum of the soft X-ray may be considered to reflect a state of the electrons in the outer shell electron orbit and a state of the electrons in the inner shell electron orbit. The state of electrons in the outer shell electron orbit changes by being affected by an electron structure or a state of electrons of a peripheral element. On the other hand, such a change does not significantly appear in the state of electrons in the inner shell electron orbit. Thus, in an embodiment of the present disclosure, at least the state of electrons in the outer shell electron orbit is taken into consideration in specifying the peak energy sequence.

The form of the actual spectrum changes due to various factors such as an electron transition probability, an X-ray detection efficiency, a sample state, an energy characteristic of a detector, a responsiveness of the detector, or the like. Because of this, it is not easy to calculate, based on theory, the calculated spectrum coinciding with the actual spectrum. On the other hand, theory-based calculation of a plurality of peak energies (a plurality of calculated peak energies) corresponding to a plurality of peak energies (a plurality of actual peak energies) in the actual spectrum is possible, as the present inventors have confirmed through experiments.

A method of creating a database according to an embodiment of the present disclosure comprises a calculation step, a detection step, a specifying step, and a registering step. In the calculation step, a distribution of a density of states of electrons is calculated based on emission information. In the detection state, one or a plurality of peaks included in the distribution of the density of states of the electrons or in a waveform generated from the distribution of the density of states of the electrons are detected. In the specifying step, a peak energy sequence is specified based on the one or the plurality of peaks that are detected. In the registering step, the peak energy sequence is registered in a database for generating a calculated spectrum to be compared with an actual spectrum which is acquired from a sample. The peak energy sequence determines an energy position of one or a plurality of functions of the calculated spectrum.

A program according to an embodiment of the present disclosure is a program executed by an information processing device. The program comprises a function to acquire a peak energy sequence correlated to emission information, a function to fit a calculated spectrum which is based on the peak energy sequence with respect to an actual spectrum which is acquired from a sample, and a function to analyze the sample based on the emission information correlated to the calculated spectrum when the calculated spectrum satisfies a fitting condition.

The program may be stored in a storage medium for non-transitory storage. The storage medium may be a transportable storage medium. In the present disclosure, a spectrum which is measured is called an "actual spectrum", and a spectrum generated based on a numerical sequence which is calculated based on theory is called a "calculated spectrum".

(2) Details of Embodiment

Figure 1:
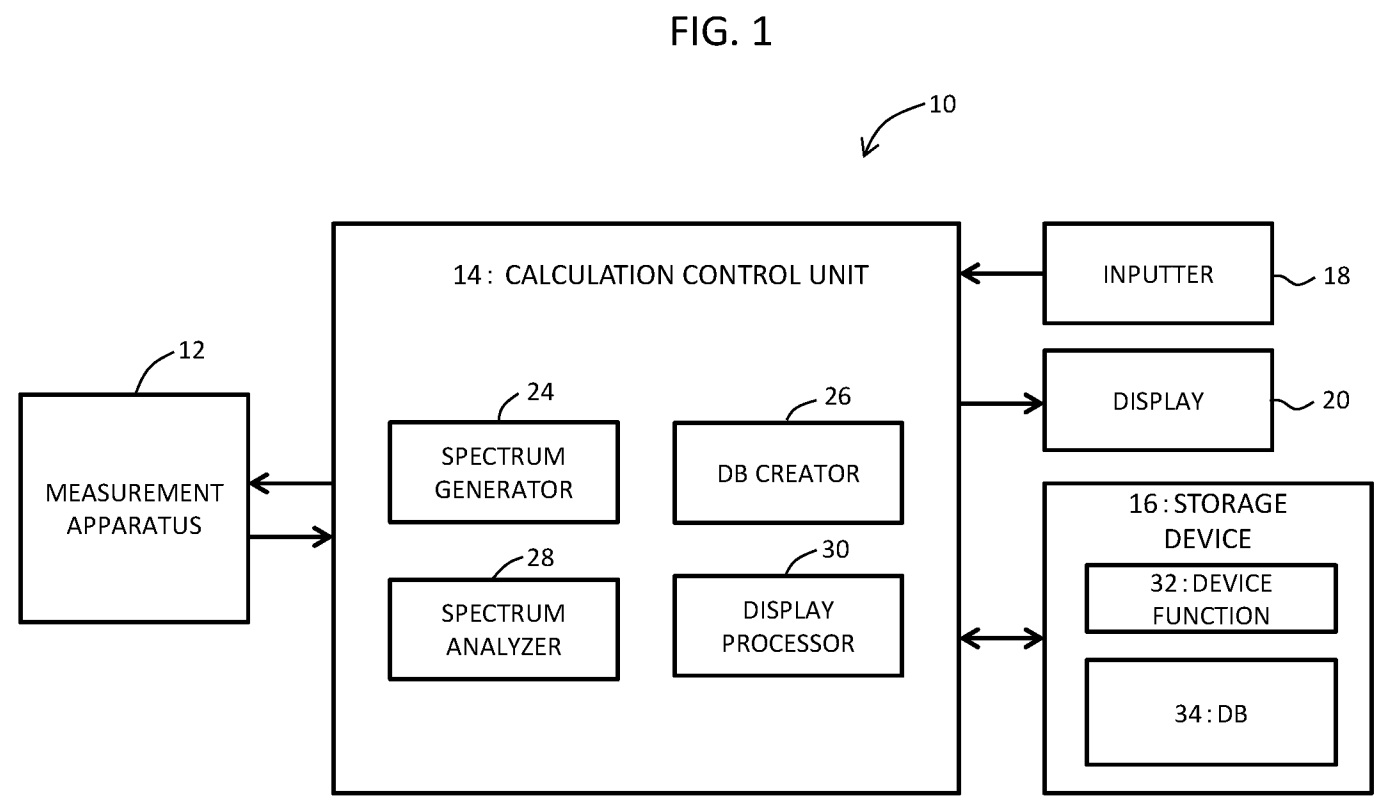

FIG. 1 shows a spectrum measurement system according to an embodiment of the present disclosure. The spectrum measurement system is roughly formed from an information processing device 10 and a measurement apparatus 12. The spectrum measurement system is, for example, an electron microscope system, an electron probe microanalyzer (EPMA), or the like. The spectrum measurement system according to the present embodiment has functions of generating a characteristic X-ray spectrum through spectroscopy of a characteristic X-ray belonging to a soft X-ray region, and analyzing the characteristic X-ray spectrum. The measurement apparatus 12 will be described later with reference to FIG. 2.

The information processing device 10 is formed from, for example, a computer. The information processing device 10 has a calculation control unit 14, a storage device 16, an inputter 18, and a display 20. The calculation control unit 14 controls an operation of the measurement apparatus 12, and also executes various calculations. The calculation control unit 14 is in reality formed from a processor which executes a program. The processor is, for example, a CPU (Central Processing Unit). In FIG. 1, a plurality of functions realized by the calculation control unit 14 are represented by a plurality of boxes.

The calculation control unit 14 has a spectrum generator 24, a database (DB) creator 26, a spectrum analyzer 28, a display processor 30, or the like. The spectrum generator 24 generates a spectrum (characteristic X-ray spectrum) based on a signal which is output from a spectrometer in the measurement apparatus 12. In the present embodiment, as described above, the characteristic X-ray belonging to the soft X-ray region is detected by the measurement apparatus 12. More specifically, a characteristic X-ray caused by electron transition from a valence band (a particular outer shell electron orbit) to a particular inner shell electron orbit is detected.

The DB creator 26 is a module that creates a database (DB) 34. The DB 34 is constructed in the storage device 16. A plurality of records are registered in the DB 34. Each individual record includes emission information and a peak energy sequence.

In the present embodiment, in order to specify the peak energy sequence, a distribution of a density of states (DOS) of electrons (hereinafter, also referred to as "DOS distribution") in a transition-origin electron orbit is calculated based on theory and from the emission information. A horizontal axis in the DOS distribution is an energy axis, and a vertical axis in the DOS distribution is a DOS axis. The DOS distribution may also be called a DOS function. A program for calculating the DOS distribution is known. In the present embodiment, a spread waveform for specifying the peak energy sequence is generated from the calculated DOS distribution. In this process, a device function 32 in the storage device 16 is used.

The spectrum analyzer 28 functions as a fitting unit and an analyzer. More specifically, the spectrum analyzer 28 fits a plurality of calculated spectra with respect to an actual spectrum (characteristic X-ray spectrum) which is acquired from the sample, and specifies a calculated spectrum which satisfies a predetermined fitting condition, among the plurality of calculated spectra. For example, a calculated spectrum having the highest similarity is specified. Then, the spectrum analyzer 28 refers to the emission information included in the record corresponding to the specified calculated spectrum, and analyzes the sample based on the emission information. For example, an emission element (an element which has caused the emission), an emission X-ray (the type of characteristic X-ray which is emitted), or the like is specified. Alternatively, a plurality of calculated spectra satisfying the predetermined fitting condition may be specified, and reference may be made to a plurality of pieces of emission information corresponding to the plurality of calculated spectra.

The display processor 30 generates an image representing a result of the spectrum analysis. The image is displayed on the display 20. An electron microscope image, an element map, or the like may be displayed on the display 20. The display 20 is formed from a display device such as an LCD. The user inputs the emission information or the like by means of the inputter 18. An energy range to be analyzed is designated using the inputter 18. Alternatively, the energy range may be automatically determined. The inputter 18 is formed from, for example, a keyboard. The storage device 16 is formed from a semiconductor memory, a hard disk drive, or the like. Alternatively, the calculation control unit 14 may be formed from a plurality of processors.

FIG. 2 shows an example structure of the measurement apparatus 12. The measurement apparatus 12 is, for example, a scanning electron microscope. The measurement apparatus 12 has a lens barrel 40 and a base unit 42. The lens barrel 40 comprises an electron gun, a deflection scanning lens, an objective lens, or the like, and generates an electron beam 52. The base unit 42 has a housing which surrounds a sample chamber 46. A stage 48 is placed in the sample chamber 46, and a sample 50 is placed on the stage 48. The electron beam 52 is illuminated to a particular position of the sample 50. With this illumination, emission is caused in the sample 50; that is, an X-ray (characteristic X-ray) 62 is caused. In the present embodiment, the X-ray 62 to be observed is, for example, a soft X-ray of an energy of 1 keV or less. Alternatively, an upper limit of an observation band may be set to an energy higher than 1 keV, or an energy lower than 1 keV. Alternatively, the observation band may be switched.

A soft X-ray spectrometer 54 is specifically a wavelength-dispersive X-ray detector. The soft X-ray spectrometer 54 comprises a wavelength dispersive element (diffraction grating) 56 and a detector 58. The wavelength dispersive element 56 has a function to decompose multiple-wavelength components of the soft X-ray 62. The wavelength dispersive element 56 has a line of grooves having a continuously changing pitch. The multiple-wavelength components decomposed by the wavelength dispersive element 56 form dispersive X-rays 64 which are spatially spread, and which are simultaneously detected by the detector 58.

The detector 58 is formed from a plurality of detection elements which are two-dimensionally arranged, and is formed from, for example, a CCD (Charge-Coupled Device). A controller 60 is connected to the detector 58, and a detection signal is output from the controller 60. The detection signal is a signal indicating each component of the X-ray spectrum. Alternatively, a plurality of wavelength dispersive elements may be provided, and may be selectively used. Alternatively, spectrometers of other types may be used.

Figure 3:
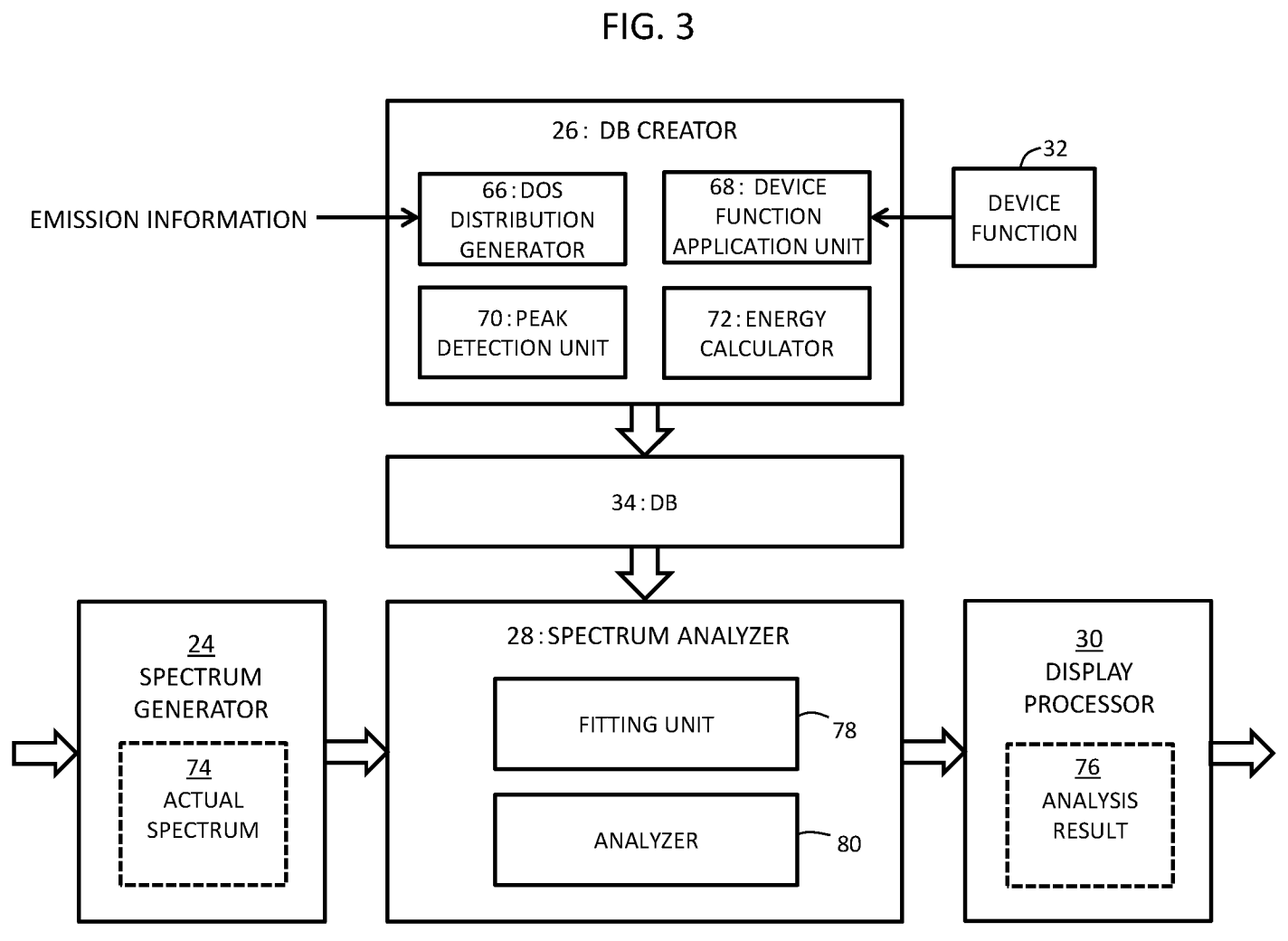

FIG. 3 shows a structure of the information processing device shown in FIG. 1, in particular, the structure of the calculation control unit. The spectrum generator 24 generates an actual spectrum 74 based on the detection signal which is output from the soft X-ray spectrometer 54. The actual spectrum 74 is a soft X-ray spectrum, and includes an intrinsic waveform showing a spectrum of the characteristic X-ray caused by the electron transition from the valence band (one or a plurality of outer shell electron orbits) to the inner shell electron orbit, as already described.

A valence band of a certain element is affected by states of electrons of the peripheral elements. The above-described intrinsic waveform thus reflects the state of electrons in the valence band of the element. In the present embodiment, in order to estimate the state of electrons in the valence band, the DOS distribution of the electrons in the outer shell electron orbit is calculated based on theory, as will be described below.

In the illustrated example structure, the DB creator 26 comprises a DOS distribution generator 66, a device function application unit 68, a peak detection unit 70, and an energy calculator 72.

The DOS distribution generator 66 generates the DOS distribution based on the emission information. The emission information is formed from a plurality of information items necessary for generating the peak energy sequence. The plurality of information items include, for example, a plurality of information items for specifying a compound, a crystal structure of the compound, an emission element in the compound, the emission X-ray, or the like. A transition-origin outer shell electron orbit is specified from the emission X-ray. Further, the transition-destination inner shell electron orbit may be specified from the emission X-ray. Alternatively, information for designating the outer shell electron orbit may be directly supplied to the DOS distribution generator 66. An example of the DOS distribution will be described later with reference to FIG. 5.

The device function application unit 68 applies the device function 32 as a spread function (blur function) on the generated DOS distribution. More specifically, the device function application unit 68 executes a convolution calculation of the DOS distribution and the device function 32, to generate a spread waveform. Experiments have revealed a certain correlation relationship or peak position similarity between the generated spread waveform and the waveform of the actual spectrum, presuming the use of an appropriate device function.

The device function 32 may be determined through experiments. Alternatively, as the device function 32, functions such as a Gaussian function, a Voigt function, or the like may be used. Alternatively, the device function 32 may be determined by suitably correcting such known functions. An example of the spread waveform generated by the application of the device function 32 will be described later with reference to FIG. 6.

The peak detection unit 70 detects one or a plurality of peaks included in the spread waveform. In this process, a known peak detection technique such as a second order differentiation may be used. A peak set is formed from the one or plurality of peaks which are detected. A specific example of the peak set will be described later with reference to FIG. 6.

The energy calculator 72 converts an energy of each peak of the peak set to a position on an energy axis of the spectrum; that is, energy, according to an energy difference at a conceived electron transition (that is, an energy difference between the outer shell electron orbit and the inner shell electron orbit). With this process, a peak energy sequence is generated. Alternatively, this energy calculation may be executed when the peak set is read from the DB 34.

The peak energy sequence is formed from one or a plurality of peak energies (calculated peak energies). Each individual peak energy corresponds to one individual peak energy in the actual spectrum (actual peak energy). The concept of the peak may include an inflection point.

The DB creator 26 registers the peak energy sequence generated for each emission information in the DB 34. In this process, the DB creator 26 also registers in the DB 34 all or a part of the emission information corresponding to the peak energy sequence which is registered. By repeating these processes, a plurality of peak energy sequences which are calculated based on theory are accumulated in the DB 34. An example structure of the DB 34 will be described later with reference to FIG. 4.

In the illustrated example structure, the spectrum analyzer 28 is formed from a fitting unit 78 and an analyzer 80. The fitting unit 78 sequentially reads the plurality of peak energy sequences registered in the DB 34, and generates a calculated spectrum formed from one or a plurality of functions for each peak energy sequence. Normally, the calculated spectrum is formed from a plurality of functions. More specifically, the calculated spectrum is a combined waveform generated by combining the plurality of functions.

The fitting unit 78 changes a parameter set defining each function of the calculated spectrum, so that the calculated spectrum becomes the closest to the actual spectrum. As a function used for the spectrum fitting, there may be exemplified, for example, the Gaussian function and the Voigt function. Each of these functions has a mountain-like form which is symmetric with respect to the left and the right. As parameters defining such functions, there may be exemplified an intensity and a half width value.

For example, the fitting of the calculated spectrum with respect to the actual spectrum may be executed using the method of least squares. For this process, an optimum combination of a plurality of parameter sets is searched so that a difference between the actual spectrum and the calculated spectrum is minimized (or the similarity is maximized). When the difference is minimized, the similarity between the actual spectrum and the calculated spectrum is specified. An example of the actual spectrum will be described later with reference to FIG. 7. An example of the calculated spectrum will be described later with reference to FIG. 8.

By repeating the above-described processes, a plurality of similarities corresponding to the plurality of the calculated spectra after the fitting are determined. For example, a calculated spectrum with the best similarity is specified, and emission information corresponding to this calculated spectrum is specified. Alternatively, other calculated spectrum selection conditions (other fitting conditions) may be employed.

The analyzer 80 analyzes the sample based on the specified emission information. For example, the analyzer 80 specifies the emission element, the emission X-ray, the compound, the crystal structure, or the like. Alternatively, a plurality of calculated spectra having a similarity of greater than or equal to a certain threshold may be specified, and a plurality of emission information items corresponding to the plurality of calculated spectra may be sent to the analyzer 80. In this case, the sample analysis may be executed for each individual emission information item, or the sample analysis may be executed while comprehensively taking the plurality of emission information items into consideration.

The display processor 30 generates an analysis result 76, and displays the analysis result 76 on the display 20. The analysis result 76 includes emission element information, emission X-ray information, compound information, crystal structure information, or the like, derived from the emission information. Alternatively, a list formed from a plurality of emission information items sorted in the order of similarity may be generated as the analysis result 76.

FIG. 4 shows an example structure of the DB 34. The DB 34 is formed from a plurality of records 82. Each record 82 includes the emission information and a peak energy sequence 84. The peak energy sequence 84 is formed from one or a plurality of peak energies. Each individual peak energy means a position on an energy axis in the spectrum (energy position), and more specifically, defines an energy position of an apex in a fitting function.

Each record 82 includes, as the emission information, information 86 for specifying the compound, information 88 for specifying the crystal structure, information 90 for specifying the emission element, information 92 for specifying the emission X-ray, or the like. The information 86 represents, for example, a chemical formula. The information 88 is, for example, an identifier for specifying a type of the crystal structure, the information 90 represents, for example, the element symbol, and the information 92 is, for example, an identifier of the characteristic X-ray. Alternatively, each record 82 may include information for specifying an outer shell electron orbit, information for specifying an inner shell electron orbit, information for specifying an energy difference, or the like.

A specific example configuration will now be described with reference to FIGS. 5 to 8. The specific example configuration assumes electron transition caused in Si in $SiO_2$ (L-line emission); more specifically, electron transition from a 3s orbit and a 3d orbit which are outer shell electron orbits in the valence band to a 2s orbit which is an inner shell electron orbit. The state of electrons of the outer shell electron orbit affects the characteristic X-ray spectrum to a certain extent, but the state of electrons of the inner shell electron orbit does not significantly affect the characteristic X-ray spectrum. Therefore, the DOS distribution is calculated only for the outer shell electron orbit.

Figure 5:
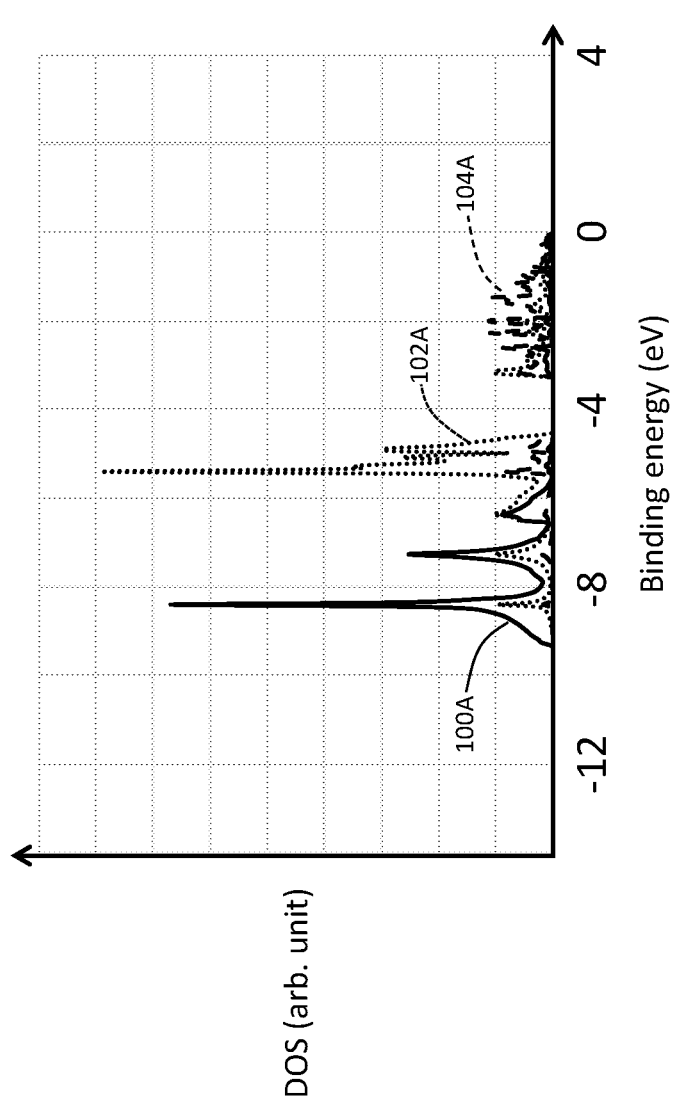
FIG. 5 is a diagram showing a plurality of DOS distributions.

In FIG. 5, the horizontal axis shows the binding energy. 0 eV corresponds to an upper end of the valence band. The vertical axis shows a number of states per unit energy (that is, the DOS). Reference numeral 100A shows a DOS distribution of electrons in the 3s orbit (refer to a thick solid line), and reference numeral 104A shows a DOS distribution of electrons in the 3d orbit (refer to a thick broken line). In FIG. 5, for reference, a DOS distribution 102A of electrons in the 3p orbit is also shown (refer to a thin broken line). The DOS distributions 100A, 102A, and 104A are calculated based on theory from the emission information. More specifically, the compound, the crystal structure, the element, the outer shell electron orbit, and the like are referred to in the calculation of the DOS distributions 100A, 102A, and 104A.

Figure 6:
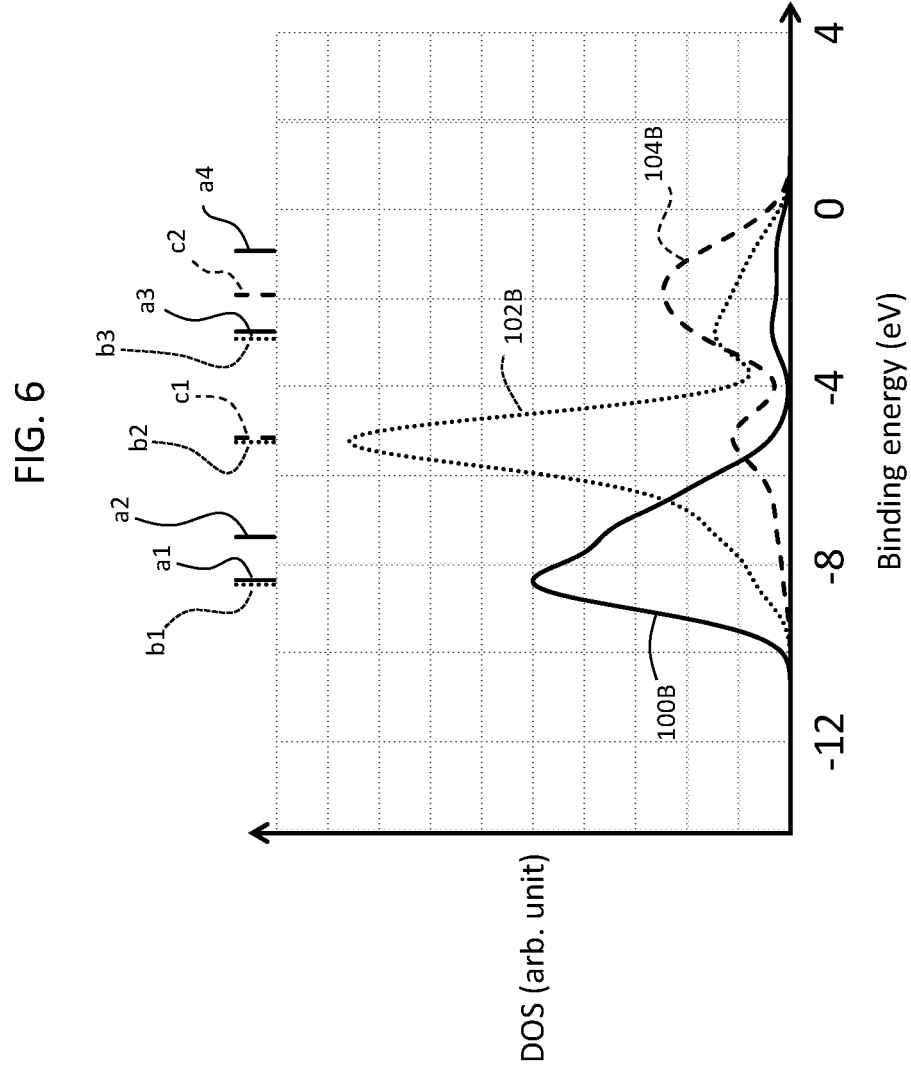
FIG. 6 is a diagram showing a plurality of spread waveforms generated from a plurality of DOS distributions.

The device function is applied to each of the DOS distributions 100A and 104A shown in FIG. 5, to generate spread waveforms 100B and 104B shown in FIG. 6. FIG. 6 also shows a spread waveform 102B generated by applying the device function to the DOS distribution 102A.

In FIG. 6, the horizontal axis shows the binding energy, and the vertical axis shows the number of states per unit energy (DOS). In the spread waveforms 100B, 102B, and 104B, the peaks are spread in the horizontal axis direction, and the waveforms as a whole are smoothened.

FIG. 6 shows peaks a1, a2, a3, and a4 (first peak set) specified through peak detection with respect to the spread waveform 100B, and also shows peaks c1 and c2 (second peak set) specified through peak detection with respect to the spread waveform 104B. For reference, FIG. 6 further shows peaks b1, b2, and b3 of the spread waveform 102B.

A first peak energy sequence can be generated by subtracting the energy difference from the 3s orbit to the 2p orbit from the energies of the peaks a1, a2, a3, and a4 of the first peak set. Similarly, a second peak energy sequence can be generated by subtracting the energy difference from the 3s orbit to the 2p orbit from the energies of the peaks c1 and c2 of the second peak set. The first peak energy sequence and the second peak energy sequence are registered in the DB. In this process, the peak energy sequences may be registered separately or integrally. In this process, the sign of each individual peak energy is removed.

Figure 7:
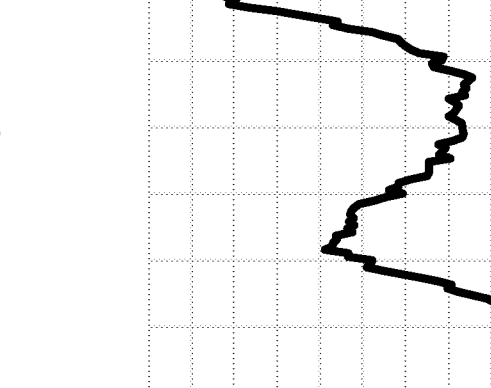
FIG. 7 is a diagram showing an example of an actual spectrum.

FIG. 7 shows an actual spectrum 112 of the above-described L-line emission. The horizontal axis shows the X-ray energy, and the vertical axis shows the intensity.

Figure 8:
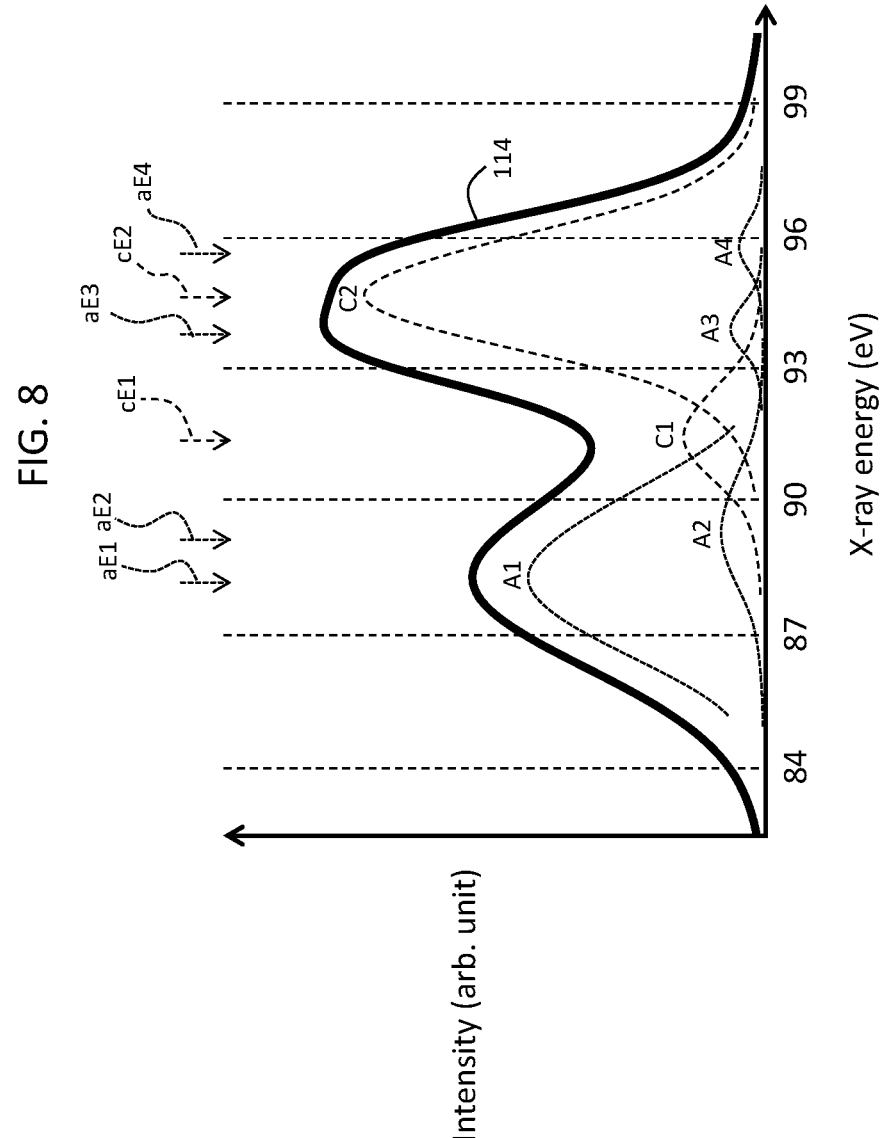
FIG. 8 is a diagram showing an example of a calculated spectrum.

FIG. 8 shows a calculated spectrum 114 generated from the first peak energy sequence and the second peak energy sequence described above. The horizontal axis shows the X-ray energy, and the vertical axis shows the intensity. The calculated spectrum 114 is formed from a plurality of functions A1, A2, A3, and A4 corresponding to a plurality of peak energies aE1, aE2, aE3, and aE4 of the first peak energy sequence, and a plurality of functions C1 and C2 corresponding to a plurality of peak energies cE1 and cE2 of the second peak energy sequence. That is, the calculated spectrum 114 is formed by combining these functions.

A basic function used for the fitting process is, for example, the Gaussian function and the Voigt function. While FIG. 8 shows the form of each function, the form is merely for the purpose of explaining the embodiment of the present disclosure.

The calculated spectrum 114 shown in FIG. 8 is in a state after the fitting is completed. In this state, a similarity is calculated between the actual spectrum 112 shown in FIG. 7 and the calculated spectrum 114 shown in FIG. 8, and is recorded.

The content of FIG. 7 and the content of FIG. 8 show results of actual experiments. By suitably setting the device function, it is possible to specify a plurality of calculated peak energies close to a plurality of actual peak energies of the actual spectrum, from the spread waveform based on the DOS distribution.

In order to analyze unknown actual spectra, it is desired to register various peak energy sequences corresponding to various emission information in the DB. For example, when the compound is already specified and the crystal structure is to be analyzed, one or a plurality of peak energy sequences corresponding to the compound may be chosen from the DB.

Figure 9:
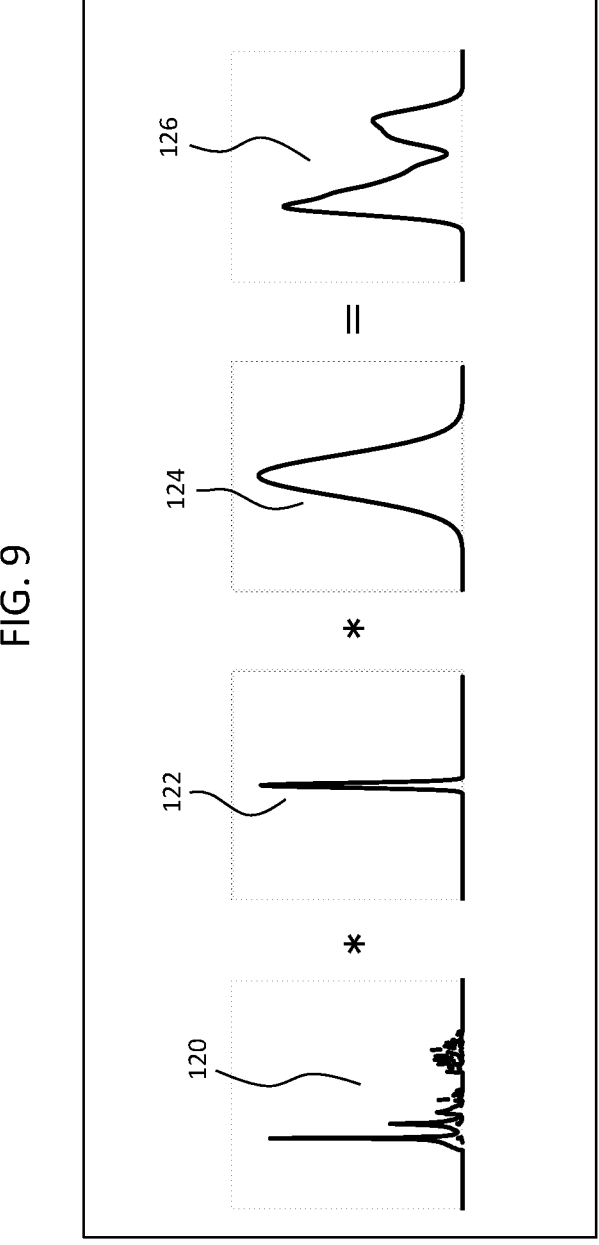
FIG. 9 is a diagram showing relationships among two DOS distributions, a device function, and a spread waveform.

FIG. 9 shows an alternative configuration of a method of generating the spread waveform. Reference numeral 120 shows a DOS distribution of electrons in the outer shell electron orbit. Reference numeral 122 shows a DOS distribution of electrons in the inner shell electron orbit. Reference numeral 124 shows the device function. A spread waveform 126 is generated by multiplying these three plots. In this alternative configuration, the DOS distribution of electrons in the inner shell electron orbit is also taken into consideration, and thus, the peak energy sequence can be more accurately specified in comparison to the case in which only the DOS distribution of the electrons in the outer shell electron orbit is taken into consideration.

In FIG. 9, the device function 124 can be backward calculated using the actual spectrum in place of the spread waveform 126. For example, the device function may be corrected using the actual spectrum which is the spectrum analysis target. A structure having such a function will be described later with reference to FIGS. 12 and 13.

FIG. 10 shows a method of creating a database according to the present embodiment. In S10, emission information is received. In S12, a DOS distribution is generated based on the emission information. In S14, a device function is applied with respect to the generated DOS distribution, and a spread waveform is generated. In S16, one or a plurality of peaks included in the spread waveform are detected. That is, a peak set is specified. In S18, an energy of each peak in the peak set is changed according to the above-described energy difference. With this process, a peak energy sequence is generated. In S20, the peak energy sequence is registered in the DB. In this process, the emission information is also registered. In S22, it is judged whether or not there is emission information to be received next. When there is such emission information, the processes from S12 are again executed.

FIG. 11 shows a method of analyzing a spectrum according to the present embodiment. An initial value of k is 1. In S30, a kth record in the DB is selected and is acquired. A calculated spectrum is generated based on the peak energy sequence included in the acquired record. More specifically, the parameter set defining each individual function of the calculated spectrum is improved such that the calculated spectrum is the most closely fitted with respect to the actual spectrum. When the best fitting state is realized, in S34, a similarity is calculated between the actual spectrum and the calculated spectrum, and is recorded. Alternatively, a difference or a normalized difference may be recorded in place of the similarity. In S36, it is judged whether or not there is a next record in the DB. When there is a next record, in S38, the value of k is incremented by 1, and the processes from S30 are again executed.

When it is judged in S36 that there is no next record, in S38, a record corresponding to a calculated spectrum satisfying the fitting condition is specified. Specifically, the emission information in the record is specified. In S40, the sample is analyzed based on the specified emission information. More specifically, information including the emission element, the compound containing the emission element, the crystal structure of the compound, the emission X-ray, or the like is output.

Figure 12:
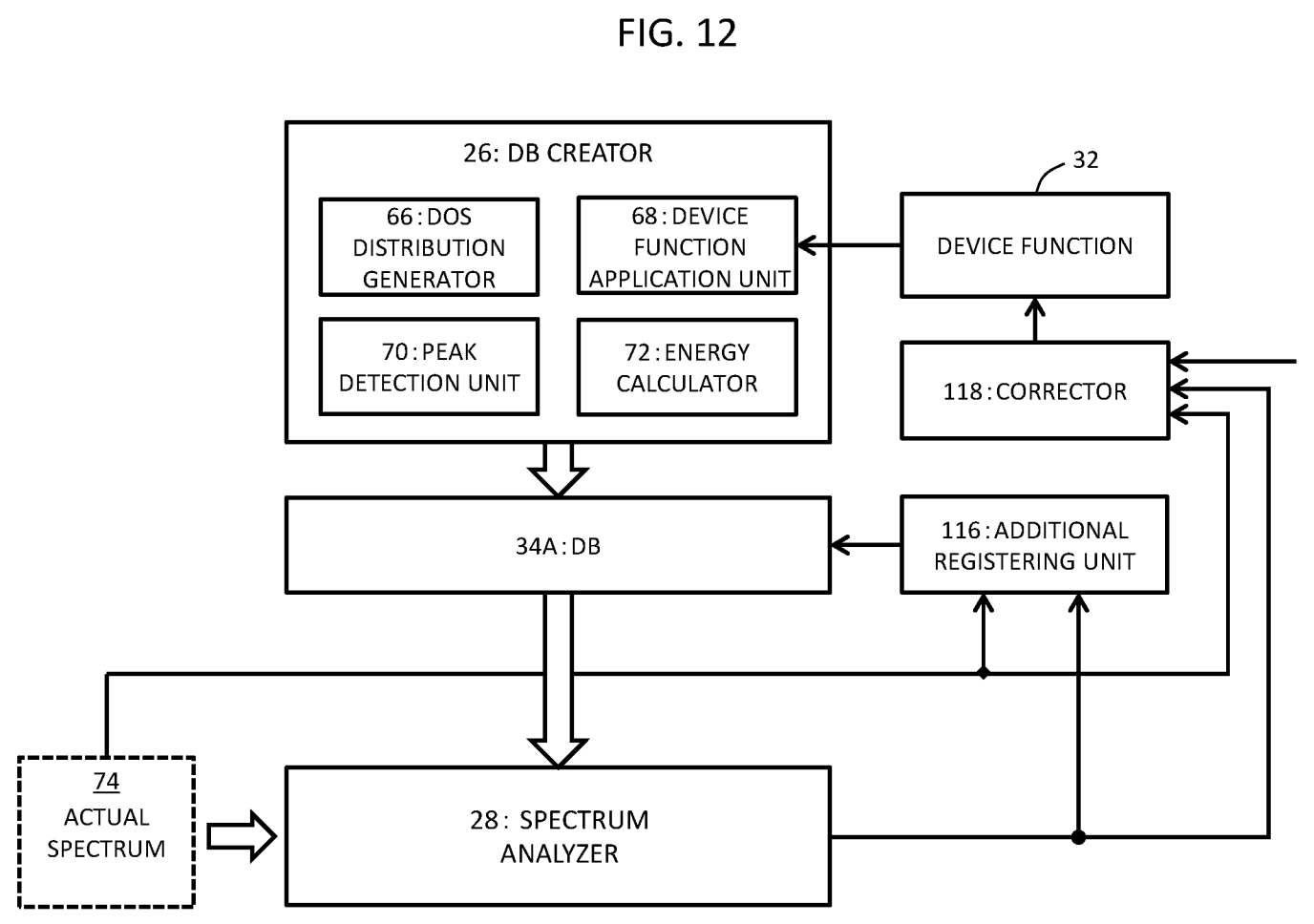

A structure according to an alternative configuration will now be described with reference to FIGS. 12 and 13. In FIGS. 12 and 13, elements similar to those of FIGS. 3 and 4 are assigned the same reference numerals, and will not be described again.

In FIG. 12, an additional registering unit 116 is a unit which additionally registers the actual spectrum 74 to a DB 34A. In this process, the actual spectrum 74 is registered in a record corresponding thereto, or is linked to the record. The additionally registered actual spectrum 74 is referred to or used in a predetermined calculation as necessary. The additional registering unit 116 also has a function to additionally register to the DB 34A a function set forming a calculated spectrum satisfying the fitting condition. The function set is registered in or linked to the record corresponding to the actual spectrum 74. Alternatively, a group of parameters may be registered in place of the function set. The function set is referred to in an auxiliary manner or directly used when another actual spectrum is analyzed.

A corrector 118 is a unit which corrects the device function 32 based on the actual spectrum 74. For example, the device function 32 may be adaptively corrected such that a difference between the actual spectrum 74 and the calculated spectrum fitted with respect to the actual spectrum 74 is minimized. Alternatively, the device function 32 may be corrected in consideration of a spectrum or another device function acquired by another spectrum measurement system. For example, various actual spectra acquired by various spectrum measurement system may be supplied to the spectrum analyzer 28, and the device function 32 may be corrected such that the above-described difference is minimized over these actual spectra as a whole. With this process, a device function 32 having a low device dependency can be formed.

FIG. 13 shows the database 34A according to the alternative configuration. Each record 82 includes information 120 for specifying the actual spectrum, and also includes information 122 for specifying a function set formed from a plurality of functions of the calculated spectrum. Alternatively, each of the information 120 and 122 may be a pointer or a URL. Alternatively, a group of parameters may be registered in place of the function set.

The invention claimed is:

1. A spectrum analysis apparatus comprising:
a database in which a peak energy sequence correlated to emission information is registered;
a soft X-ray spectrometer configured to acquire an actual spectrum from a sample using soft X-ray emission spectroscopy; and
a processor, wherein
the processor is configured to:
fit a calculated spectrum which is based on the peak energy sequence with respect to the actual spectrum acquired from the sample; and
analyze the sample based on the emission information correlated to the calculated spectrum when the calculated spectrum satisfies a fitting condition,
wherein the emission information is formed from a plurality of information items,
wherein the plurality of information items comprise information for specifying an element which caused an emission, and information for specifying a type of emission, and
wherein the plurality of information items comprise information for specifying a compound containing the element which caused the emission, and information for specifying a crystal structure of the compound.

2. The spectrum analysis apparatus according to claim 1, wherein
the processor is further configured to:
determine one or a plurality of energy positions of one or a plurality of functions of the calculated spectrum based on one or a plurality of peak energies of the peak energy sequence, and
adjust one or a plurality of forms of the one or the plurality of functions of the calculated spectrum such that the calculated spectrum becomes closer to the actual spectrum.

3. The spectrum analysis apparatus according to claim 2, wherein
each of the one or the plurality of functions has a mountain-like form, and
the processor is configured to cause an energy position of an apex of each of the one or the plurality of functions of the calculated spectrum to correspond to each of the one or the plurality of peak energies of the peak energy sequence.

4. The spectrum analysis apparatus according to claim 1, wherein
the processor is further configured to generate the peak energy sequence based on the emission information and to register the emission information and the peak energy sequence in the database.

5. The spectrum analysis apparatus according to claim 4, wherein
the processor is further configured to:
generate a distribution of a density of states of electrons based on the emission information; and generate the peak energy sequence from the distribution of the density of states of the electrons.

6. The spectrum analysis apparatus according to claim 5, wherein
the processor is further configured to:
generate a spread waveform by applying a spread function with respect to the distribution of the density of states of the electrons;
detect one or a plurality of peaks comprised in the spread waveform; and
specify the peak energy sequence based on the one or the plurality of peaks.

7. The spectrum analysis apparatus according to claim 5, wherein
the distribution of the density of states of the electrons comprises the distribution of the density of states of the electrons in an outer shell electron orbit in a valence band, and
the outer shell electron orbit is a transition-origin orbit in electron transition which causes a characteristic X-ray.

8. The spectrum analysis apparatus according to claim 7, wherein
the distribution of the density of states of the electrons further comprises the distribution of the density of states of the electrons in an inner shell electron orbit, and
the inner shell electron orbit is a transition-destination orbit in the electron transition.

9. A non-transitory storage medium storing a program executed by an information processing device, the program, when executed, causing the information processing device to perform a process comprising:
controlling a soft X-ray spectrometer to acquire an actual spectrum from a sample using soft X-ray emission spectroscopy;
acquiring a peak energy sequence correlated to emission information;
fitting a calculated spectrum which is based on the peak energy sequence with respect to the actual spectrum acquired from the sample; and
analyzing the sample based on the emission information correlated to the calculated spectrum when the calculated spectrum satisfies a fitting condition,
wherein the emission information is formed from a plurality of information items,
wherein the plurality of information items comprise information for specifying an element which caused an emission, and information for specifying a type of emission, and
wherein the plurality of information items comprise information for specifying a compound containing the element which caused the emission, and information for specifying a crystal structure of the compound.

* * * * *